(12) United States Patent
Lv et al.

(10) Patent No.: US 12,475,732 B2
(45) Date of Patent: Nov. 18, 2025

(54) PALM RECOGNITION DEVICE (71) Applicant: Tencent Technology (Shenzhen) Company Limited, Shenzhen (CN)

(72) Inventors: Zhongfang Lv, Shenzhen (CN); Runzeng Guo, Shenzhen (CN); Jiayu Huang, Shenzhen (CN); Yin-Kai Lee, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 43 days.

(21) Appl. No.: 18/378,061

(22) Filed: Oct. 9, 2023

(65) Prior Publication Data
US 2024/0037978 A1  Feb. 1, 2024

Related U.S. Application Data (63) Continuation of application No. PCT/CN2023/079841, filed on Mar. 6, 2023.

(30) Foreign Application Priority Data

Mar. 24, 2022  (CN) .......................... 202220658952.2

(51) Int. Cl.
*G06V 40/13*  (2022.01)
*H04N 23/51*  (2023.01)
*H04N 23/56*  (2023.01)

(52) U.S. Cl.
CPC ............. *G06V 40/13* (2022.01); *H04N 23/51* (2023.01); *H04N 23/56* (2023.01)

(58) Field of Classification Search
CPC ........ G06V 40/13; G06V 40/50; G06V 40/60; G06V 40/70; H04N 23/51; H04N 23/56

USPC .......................................................... 348/77
See application file for complete search history.

(56) References Cited

U.S. PATENT DOCUMENTS

| | | | | |
|---|---|---|---|---|
| 5,335,288 | A * | 8/1994 | Faulkner | G06V 40/11 382/115 |
| 10,588,178 | B1 * | 3/2020 | Nelson | H05B 3/141 |
| 11,151,234 | B2 * | 10/2021 | Kontsevich | G06V 40/1365 |
| 2005/0286744 | A1 * | 12/2005 | Yoshizu | G06V 40/145 382/115 |

(Continued)

FOREIGN PATENT DOCUMENTS

| CN | 1586395 A | 3/2005 |
|---|---|---|
| CN | 1685357 A | 10/2005 |

(Continued)

OTHER PUBLICATIONS

Tencent Technology, ISR, PCT/CN2023/079841, May 24, 2023, 2 pgs.

(Continued)

*Primary Examiner* — Brian T Pendleton
(74) *Attorney, Agent, or Firm* — Morgan, Lewis & Bockius LLP (57) ABSTRACT

A palm recognition device is provided, and belongs to the field of the electronic device technologies. The palm recognition device includes a housing, a PCB, and a camera. The PCB and the camera are both located inside the housing. The housing has an image capturing window, and a projection of the camera on the image capturing window deviates downward relative to a central point of the image capturing window.

9 Claims, 6 Drawing Sheets (56) References Cited

U.S. PATENT DOCUMENTS

| | | | |
|---|---|---|---|
| 2009/0123041 A1 | 5/2009 | Tani | |
| 2011/0292212 A1* | 12/2011 | Tanabe | B05B 1/08 |
| | | | 348/148 |
| 2012/0014569 A1* | 1/2012 | Frye | G06V 40/1318 |
| | | | 382/124 |
| 2017/0124370 A1* | 5/2017 | He | G06V 40/40 |
| 2020/0125815 A1* | 4/2020 | Lu | G06F 21/32 |
| 2020/0279087 A1* | 9/2020 | Seo | G01S 7/52079 |
| 2022/0285461 A1* | 9/2022 | Hatsumi | H10K 59/40 |
| 2022/0342972 A1* | 10/2022 | Van Os | G06V 40/172 |

FOREIGN PATENT DOCUMENTS

| | | |
|---|---|---|
| CN | 102402679 A | 4/2012 |
| CN | 109176562 A | 1/2019 |
| CN | 109614782 A | 4/2019 |
| CN | 111881719 A | 11/2020 |
| CN | 213069856 U | 4/2021 |
| CN | 215341168 U | 12/2021 |
| CN | 114067377 A | 2/2022 |
| CN | 215729879 U | 2/2022 |
| CN | 217061035 U | 7/2022 |
| JP | 2008065570 A | 3/2008 |
| WO | WO 2012011181 A1 | 1/2013 |
| WO | WO 2014115682 A1 | 7/2014 |

OTHER PUBLICATIONS

Tencent Technology, WO, PCT/CN2023/079841, May 24, 2023, 5 pgs.
Tencent Technology, IPRP, PCT/CN2023/079841, Sep. 24, 2024, 6 pgs.
Tencent Technology, Extended European Search Report, EP Patent Application No. 23773598.0, Mar. 27, 2025, 7 pgs.

\* cited by examiner

FIG. 6

PALM RECOGNITION DEVICE

CROSS-REFERENCE TO RELATED APPLICATIONS

The present disclosure is a continuation application of PCT Patent Application No. PCT/CN2023/079841, entitled "PALM RECOGNITION DEVICE" filed on Mar. 6, 2023, which claims priority to Chinese Patent Application No. 202220658952.2, entitled "PALM RECOGNITION DEVICE" filed with the China National Intellectual Property Administration on Mar. 24, 2022, all of which is incorporated herein by reference in its entirety.

FIELD OF THE TECHNOLOGY

The present disclosure relates to the field of electronic device technologies, and in particular, to a palm recognition device.

BACKGROUND OF THE DISCLOSURE

A palm recognition device is a device that captures a palm image by a camera, and recognizes the palm image.

For the palm recognition device, how to improve quality of the palm image captured by the palm recognition device is a critical technical problem.

SUMMARY

The present disclosure provides a palm recognition device, including a housing, a printed circuit board (PCB), and a camera, the housing having a transparent image capturing window; the PCB being electrically connected to the camera, the PCB and the camera both being located inside the housing; and a projection of the camera on the image capturing window deviating downward relative to a central point of the image capturing window.

ILLUSTRATION OF THE DRAWINGS

1: housing, 11: bottom housing, 110: accommodating trough, 111: speaker hole, 12: panel, 120: image capturing window, o: central point, and I: central axis;
2: PCB;
3: camera;
4: light component, 41: light-emitting member, and 42: light guide ring;
5: speaker; and
6: wire.

DESCRIPTION OF EMBODIMENTS

To make the objectives, technical solutions, and advantages of the present disclosure clearer, the following further describes implementations of the present disclosure in detail with reference to the accompanying drawings.

Terms used in the implementations of the present disclosure are merely used to explain embodiments of the present disclosure, and are not intended to limit the present disclosure. Unless otherwise defined, the technical terms or scientific terms used in the implementations of the present disclosure are to have general meanings understood by a person of ordinary skill in the field of the present disclosure. "One", "a", or similar terms used in the specification of the present disclosure and claims do not indicate a quantity limitation, but indicate that there is at least one. "Comprise", "include", or similar terms mean that elements or articles appearing before "comprise" or "include" cover listed elements or articles appearing after "comprise" or "include" and equivalents thereof, and do not exclude other elements or articles. "Connection", "connected", or similar terms are not limited to a physical or mechanical connection, but may include an electrical connection, regardless of a direct or indirect connection. "Up", "down", "left", "right", and the like are merely used for indicating relative positional relationships. After absolute positions of described objects change, relative positional relationships may also change. "A plurality of" means two or more, unless otherwise definitely limited.

A palm recognition device is a device that captures a palm image by a camera, and recognizes the palm image. For the palm recognition device, improving quality of the palm image captured by the palm recognition device is a precondition of improving a recognition speed and recognition accuracy of the palm recognition device.

Figure 1:
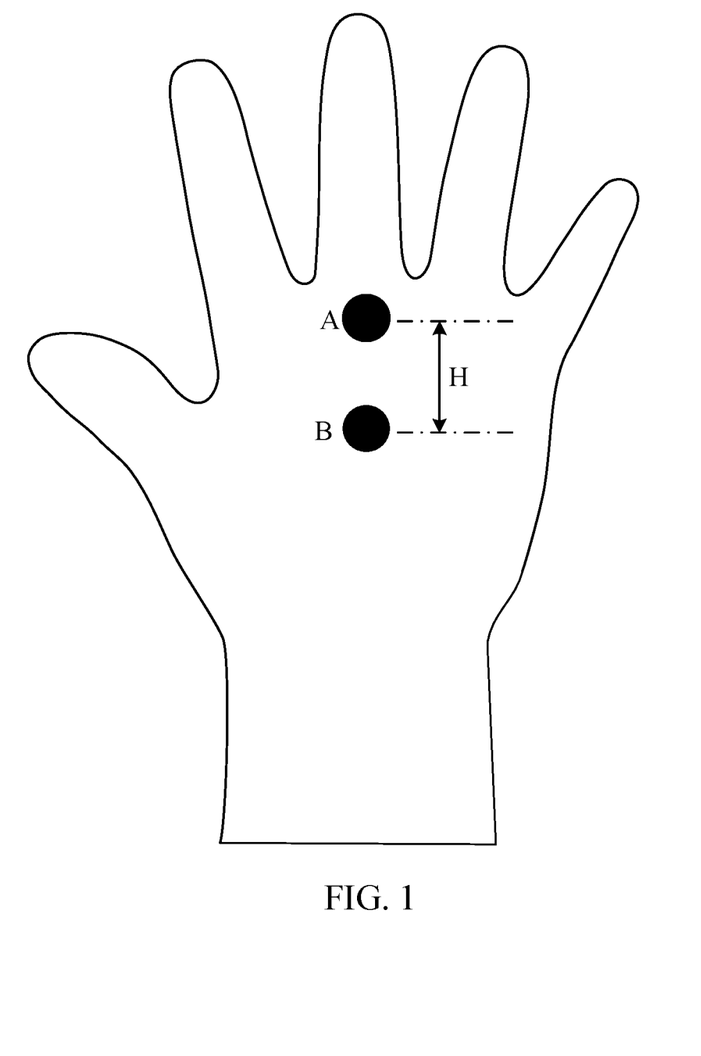
FIG. 1 is a schematic diagram of a palm according to an embodiment of the present disclosure.

According to experiments, as shown in FIG. 1, when a user aligns an actual central point B of the palm with a camera of the palm recognition device, the quality of the palm image captured by the palm recognition device is relative high. During palm recognition, the user generally considers a point A as a central point of the palm, and aligns the point A with a central point of an image capturing window of the palm recognition device.

Cameras of palm recognition devices in the related art all face central points of image capturing windows. Therefore, palm images captured by these palm recognition devices are all palm images captured when cameras directly face points A of the palms. Quality of the palm images are relatively low, affecting the recognition speed and recognition accuracy of the palm recognition devices, so that during use of the palm recognition device, the user feels the recognition is insensitive, and needs to move the palm up and down for recognition.

In view of the foregoing technical problem, the embodiments of the present disclosure provide a palm recognition device. Quality of a palm image captured by the palm recognition device is relative high, and helps improve a recognition speed and recognition accuracy of the palm recognition device.

The palm recognition device provided in the embodiments of the present disclosure is described below.

Figure 2:
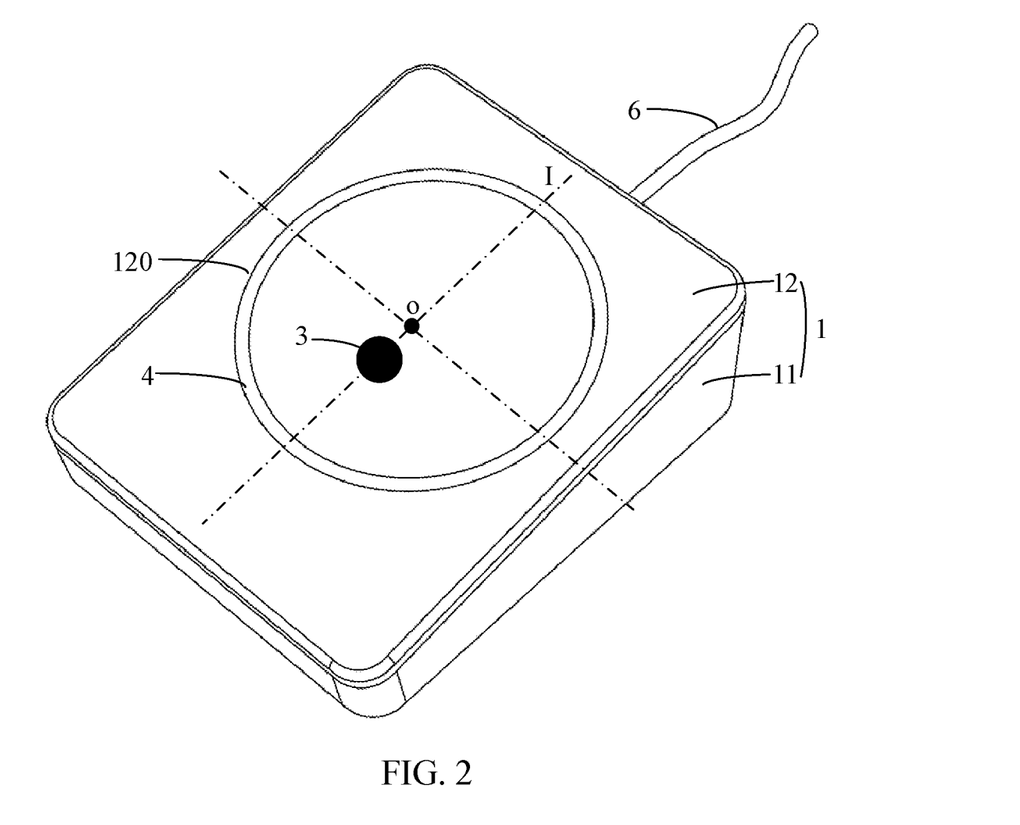
FIG. 2 is a schematic diagram of a palm recognition device according to an embodiment of the present disclosure.
Figure 5:
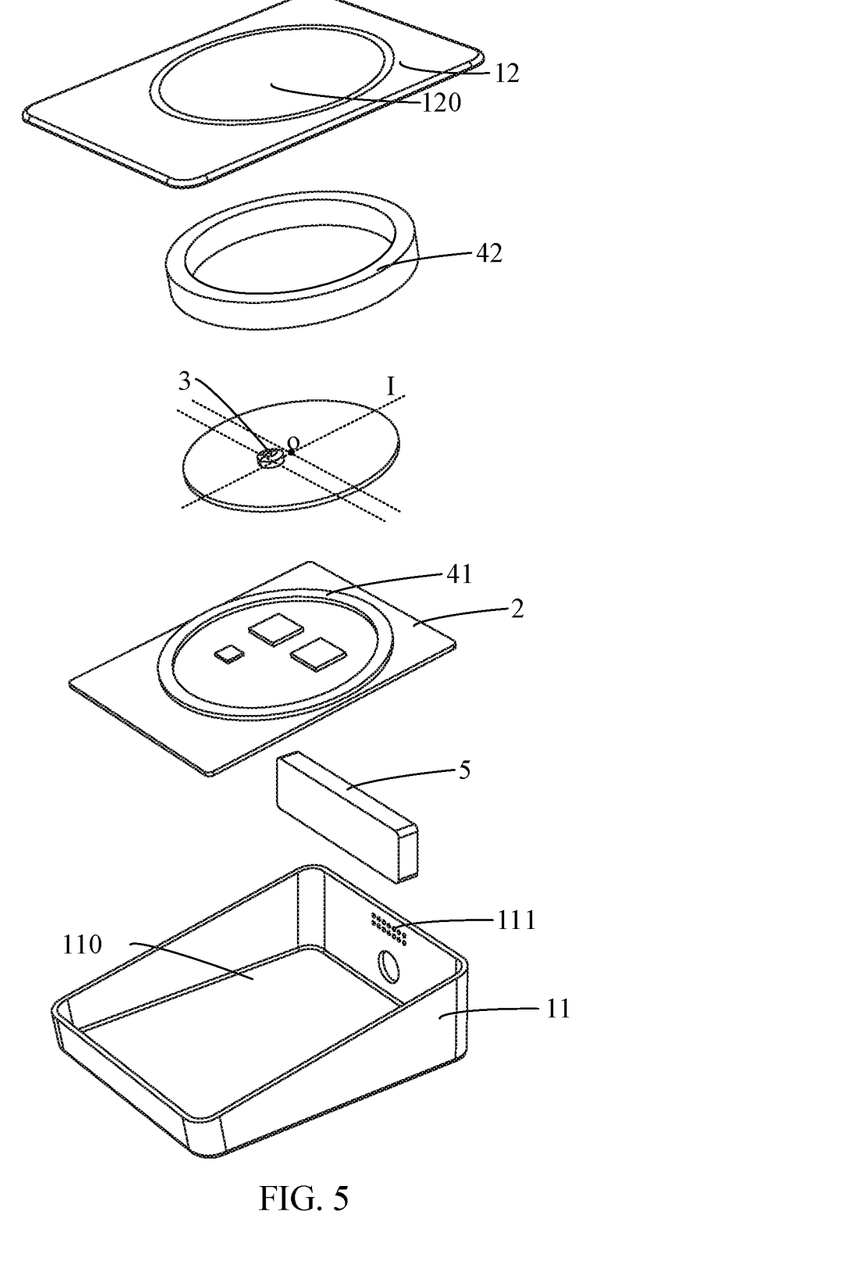
FIG. 5 is an exploded view of a palm recognition device according to an embodiment of the present disclosure.
Figure 6:
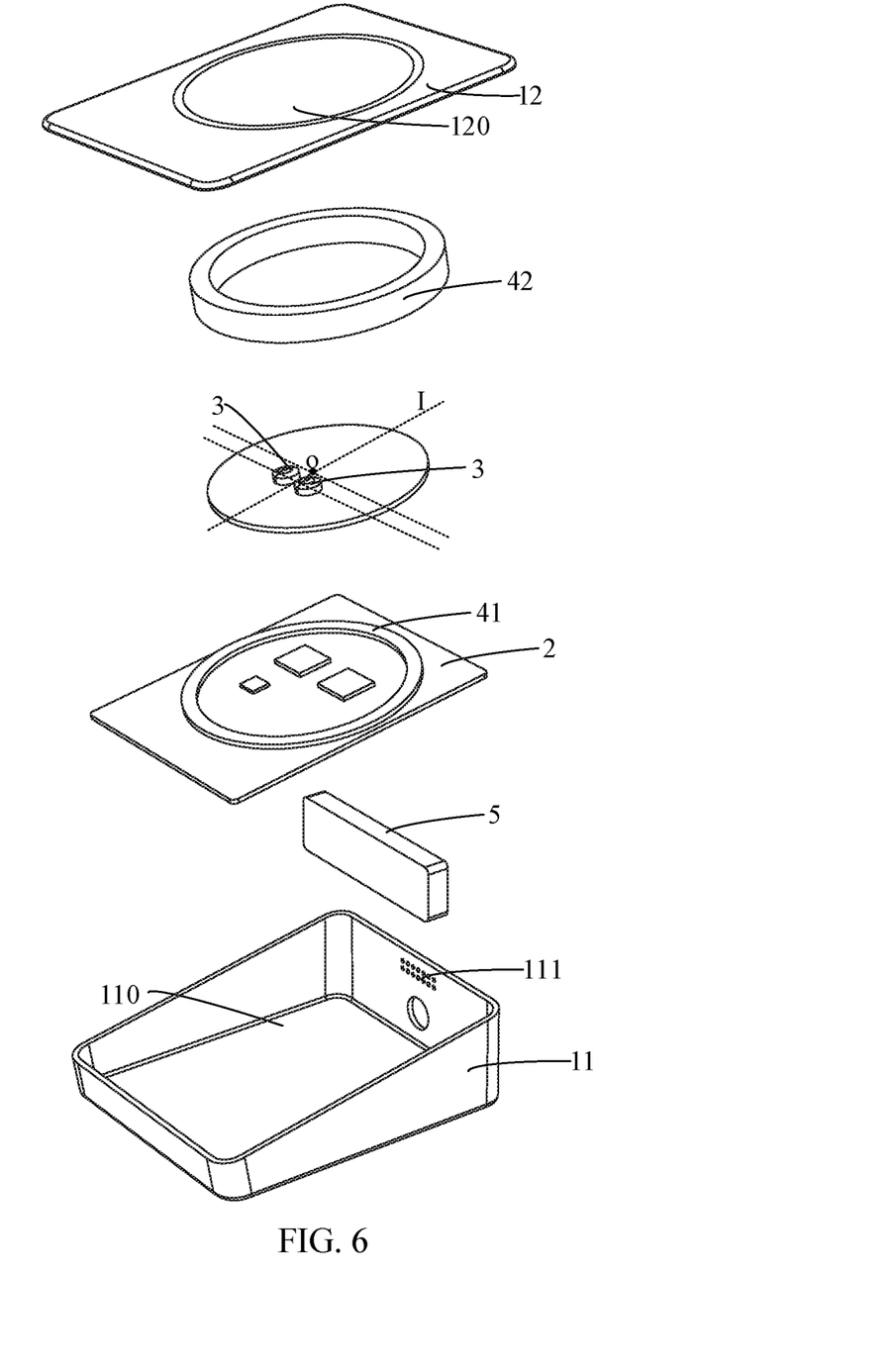
FIG. 6 is an exploded view of a palm recognition device according to an embodiment of the present disclosure.

As shown in FIG. 2, FIG. 5, and FIG. 6, the palm recognition device includes a housing 1, a printed circuit board (PCB) 2, and a camera 3. The housing 1 has a transparent image capturing window 120. The PCB 2 is electrically connected to the camera 3, and the PCB 2 and the camera 3 are both located inside the housing 1. The camera 3 faces toward the image capturing window 120, and a projection of the camera 3 on the image capturing window 120 deviates downward relative to a central point o of the image capturing window 120.

A specific application of the palm recognition device is not limited in this embodiment of the present disclosure. In some examples, the palm recognition device is used for payment, and in some other examples, the palm recognition device is used as a part of door control.

The housing 1 is a structural member of the palm recognition device, and is configured to support and fix other components of the palm recognition device.

The PCB 2 is equipped with a processor, a chip, an interface, and other electronic modules. The PCB 2 can recognize the palm image captured by the camera 3, and can control the camera 3.

The camera 3 is configured to capture the palm image. A type of the camera 3 is not limited in this embodiment of the present disclosure. In some examples, the camera 3 includes at least one of a two-dimensional camera and a three-dimensional camera. In addition, the camera 3 may further include at least one of an infrared light module and a depth map module, to improve quality of the palm image captured by the camera 3.

The projection of the camera 3 on the image capturing window 120 is a projection along a direction of a central axis of the camera 3. The central axis of the camera 3 is a principal optical axis of the camera 3. That a projection of the camera 3 on the image capturing window 120 deviates downward relative to a central point o of the image capturing window 120 may alternatively be understood as that an intersection point between the principal optical axis of the camera 3 and the image capturing window 120 deviates downward relative to the central point o of the image capturing window 120.

According to the technical solution provided in the embodiments of the present disclosure, the projection of the camera 3 on the image capturing window 120 deviates downward relative to the central point o of the image capturing window 120, so that when the user aligns a point A of the palm with the central point o of the image capturing window 120, a point that the camera 3 directly faces on the palm is located below the point A, for example, a point B or a point between the point A and the point B. Therefore, the quality of the palm image captured by the palm recognition device is relative high, which helps to improve the recognition speed and the recognition accuracy of the palm recognition device. In addition, using the palm recognition device provided in this embodiment of the present disclosure, the user does not need to change an existing habit of palm recognition.

A shooting field of view of the camera 3 is conical and radial, and therefore, in actual use, even if the camera 3 does not directly face the point B, the palm image with relative high quality can be obtained.

In some examples, h is less than H. That is, a point that the camera 3 directly faces is located between the point A and the point B.

In this way, for some users that know an actual central point of the palm is the point B, when the users align the point B with the central point o of the image capturing window 120, a point that the camera 3 directly faces on the palm does not excessively deviate relative to the point B toward a direction away from the point A, and possibility of capturing a palm image with relative low quality is reduced.

Figure 3:
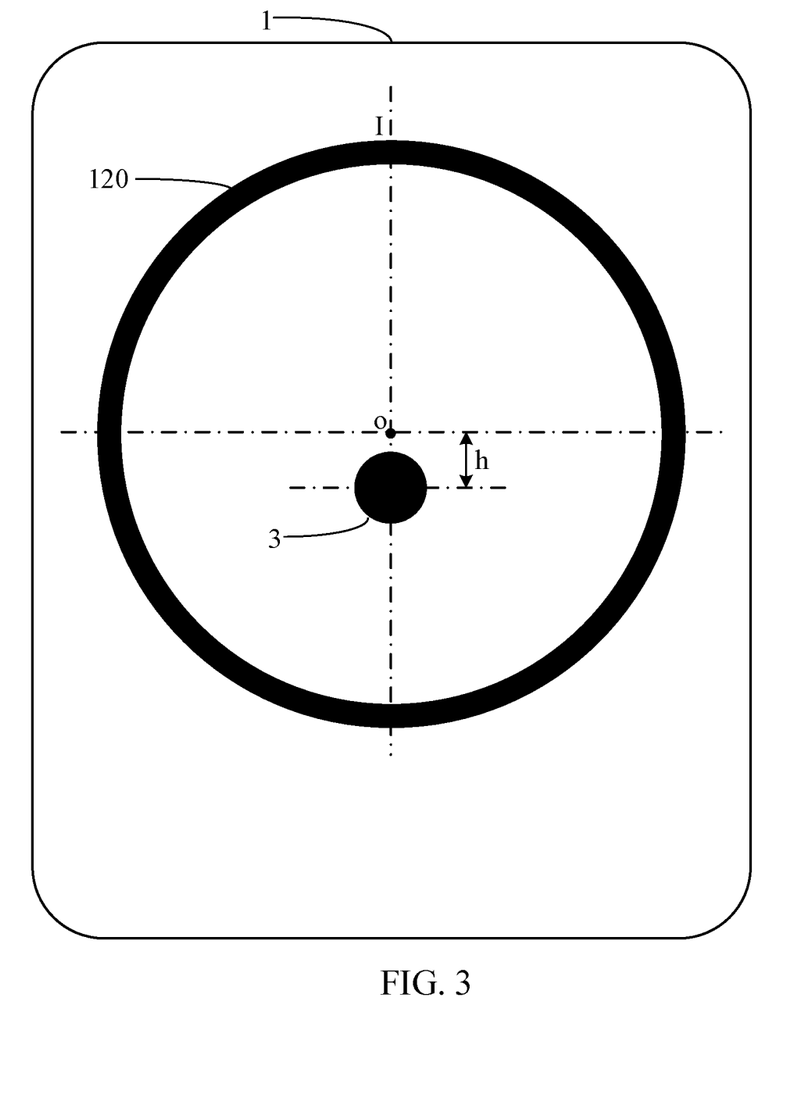
FIG. 3 is a schematic diagram of an image capturing window of a palm recognition device according to an embodiment of the present disclosure.
Figure 4:
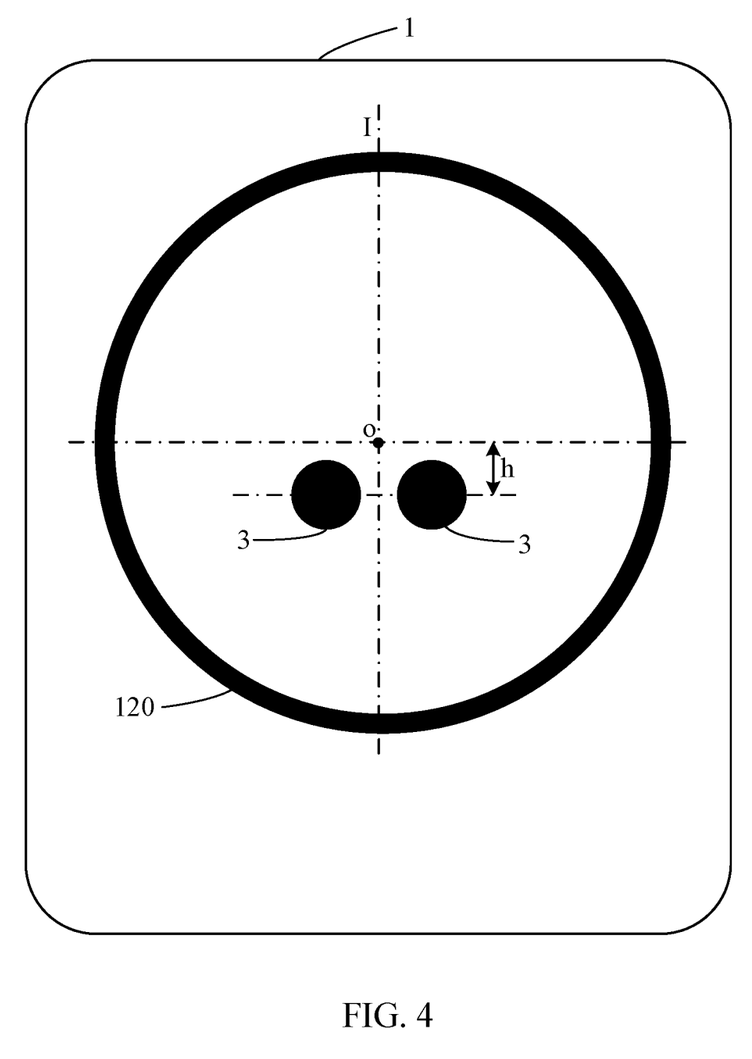
FIG. 4 is a schematic diagram of an image capturing window of a palm recognition device according to an embodiment of the present disclosure.

A distance by which the projection deviates downward relative to the central point o in this embodiment of the present disclosure is not limited. In some examples, as shown in FIG. 3 and FIG. 4, a distance h by which the projection of the camera 3 on the image capturing window 120 deviates downward relative to the central point o is greater than or equal to 5 mm, and less than or equal to 25 mm. By setting 5 mm≤h≤25 mm, that h is less than H can be implemented. That is, by setting 5 mm≤h≤25 mm, when the palm recognition device recognizes the palms of the users that consider the point A as the central point of the palm and that consider the point B as the central point of the palm, the palm images with relative high quality can be obtained.

The distance by which the projection of the camera 3 on the image capturing window 120 deviates downward relative to the central point o is equal to a distance by which the intersection point between the principal optical axis of the camera 3 and the image capturing window 120 deviates downward relative to the central point o of the image capturing window 120.

A quantity of the cameras 3 is not limited in this embodiment of the present disclosure. In some examples, as shown in FIG. 2 and FIG. 3, there is one camera 3, and the projection of the camera 3 on the image capturing window 120 is located on a central axis I of the image capturing window 120.

In some other examples, as shown in FIG. 4, there are two cameras 3, and the projections of the two cameras 3 on the image capturing window 120 are symmetrical with respective to the central axis I of the image capturing window 120.

A form of the image capturing window 120 is not limited in this embodiment of the present disclosure. In some examples, as shown in FIG. 2 to FIG. 4, the image capturing window 120 is circular. Certainly, the image capturing window 120 may alternatively be elliptical, rectangular, or the like.

The housing 1 is described in more detail below by using examples.

In some examples, as shown in FIG. 2, FIG. 5, and FIG. 6, the housing 1 includes the bottom housing 11 and the panel 12. The bottom housing 11 includes an accommodating trough 110. The panel 12 seals an opening of the accommodating trough 110, and the panel 12 has the image capturing window 120.

The panel 12 seals the accommodating trough 110 of the bottom housing 11, to protect a device in the accommodating trough 110. A type of the panel 12 is not limited in this embodiment of the present disclosure. In some examples, the panel 12 has a touch function, and is electrically connected to the PCB 2, so that the user can send an instruction to the palm recognition device by touching the panel 12. In some other examples, the panel 12 may alternatively not have the touch function. A material of the panel 12 is not limited in this embodiment of the present disclosure. In some examples, the panel 12 is a glass panel.

An application scenario of the palm recognition device is not limited in this embodiment of the present disclosure. In some examples, as shown in FIG. 2, the palm recognition device is a tabletop device to be placed on a tabletop or other support surfaces for use. In this case, the panel 12 may be arranged inclined relative to a horizontal plane.

In some other examples, the palm recognition device may alternatively be a wall-mounted device to be hung on a wall for use. In this case, the panel 12 may be arranged vertically.

To improve interaction experience between the user and the palm recognition device, in some examples, as shown in FIG. 2, the palm recognition device further includes a light component 4. The light component 4 is located inside the housing 1, and surrounds the camera 3, and the light component 4 faces the image capturing window 120.

According to the technical solution provided in this embodiment of the present disclosure, by arranging the light component 4, the palm recognition device can transmit information to the user through the light component 4.

For example, when the palm recognition device is used for payment, the light component 4 transmits information about the payment to the user. For example, when the user successfully pays, the light component 4 emits green light to represent successful payment.

In some examples, as shown in FIG. 2, the light component 4 is ring-shaped, for example, circular ring-shaped or square ring-shaped. For example, the light component 4 is circular ring-shaped, and has a same central point with the image capturing window 120.

In this way, when the light component 4 emits light, a light circle around the camera 3 is formed, and the palm recognition device is more beautiful.

In some examples, the light component 4 can emit light of a plurality of colors, and light of different colors can transmit different information. For example, green light represents that the payment succeeds, and red light represents that the payment fails.

In some examples, the light component 4 has a plurality of light emitting forms, for example, flashing light and constant light, and different light emitting forms can transmit different information.

An implementation of the light component 4 is described below by using examples.

In some examples, as shown in FIG. 5 and FIG. 6, the light component 4 includes a light-emitting member 41 and a light guide ring 42. The light-emitting member 41 is fixed on the PCB 2, and is electrically connected to the PCB 2. The light guide ring 42 surrounds the camera 3, and is located between the image capturing window 120 and the light-emitting member 41.

In some examples, the light-emitting member 41 can emit light of a plurality of colors.

A principle in which the light-emitting member 41 can emit the light of a plurality of colors is not limited in this embodiment of the present disclosure. In some examples, a lamp bead of the light-emitting member 41 may be a variable color lamp bead. A principle of the variable color lamp bead is not limited in this embodiment of the present disclosure. In some examples, the variable color lamp bead can change a color of the light according to magnitude of a current. In some other examples, the variable color lamp bead includes three sub-lamp beads that are separately red, green, and blue, and the variable color lamp bead can control lighting and extinguishing of the three sub-lamp beads to emit the light of a plurality of colors.

A form of the light-emitting member 41 is not limited in this embodiment of the present disclosure. In some examples, the light-emitting member 41 is a ring-shaped lamp. In some other examples, the light-emitting member 41 has a plurality of lamp beads, and the plurality of lamp beads are arranged in a shape of a circular ring.

The light guide ring 42 is configured to uniformly disperse the light emitted by the light-emitting member 41, so that brightness of the formed light circle is uniform.

In some examples, as shown in FIG. 5 and FIG. 6, the palm recognition device further includes a speaker 5. The speaker 5 is located inside the housing 1, and is electrically connected to the PCB 2.

The speaker 5 may be equipped with one or more speaker devices.

According to the technical solution provided in this embodiment of the present disclosure, by arranging the speaker 5, the palm recognition device can further transmit information to the user. For example, when the user successfully pays, the speaker 5 produces a prompt tone that the payment has succeeded.

In some examples, as shown in FIG. 5 and FIG. 6, the bottom housing 11 has a speaker hole 111, and the speaker hole 111 faces the speaker 5. This helps the sound produced by the speaker 5 penetrate the bottom housing 11 and be transmitted toward outside.

In some examples, as shown in FIG. 2, the palm recognition device further includes a wire 6. An end of the wire 6 extends into an interior of the housing 1, and is electrically connected to the PCB 2, and an other end is configured to be electrically connected to an external power supply.

In some examples, the palm recognition device does not have a battery inside, and the wire 6 needs to be connected to a power supply for the palm recognition device to be normally used. In this case, the wire 6 may be connected to the housing 1 non-detachably.

In some other examples, the palm recognition device has a battery inside, and when the battery has power, the wire 6 is not connected to a power supply, and the palm recognition device can be normally used. In this case, the wire 6 may be detachably connected to the housing 1 and the PCB 2, and both ends of the wire 6 have a plug.

The foregoing descriptions are embodiments of the present disclosure, but are not intended to limit the present disclosure. Any modification, equivalent replacement, or improvement made within the principle of the present disclosure shall fall within the protection scope of the present disclosure.

What is claimed is:

1. A palm recognition device, comprising a housing, a printed circuit board (PCB), a 2-D light component, and a camera both being located inside the housing,
   the housing having a transparent image capturing window that is substantially concentered with the 2-D light component;
   the PCB being electrically connected to the camera and the light component;
   the camera being located behind the transparent image capturing window and surrounded by the light component; and
   a projection of the camera on the image capturing window deviating downward relative to a central point of the image capturing window and the light component.

2. The palm recognition device according to claim 1, wherein a distance by which the projection of the camera on the image capturing window deviates downward relative to the central point is greater than or equal to 5 mm, and less than or equal to 25 mm.

3. The palm recognition device according to claim 1, wherein the projection of the camera on the image capturing window is located on a central axis of the image capturing window.

4. The palm recognition device according to claim 1, wherein there are two cameras inside the housing, and the projections of the two cameras on the image capturing window are symmetrical with respective to a central axis of the image capturing window.

5. The palm recognition device according to claim 1, wherein the image capturing window is circular.

6. The palm recognition device according to claim 1, wherein the housing comprises a bottom housing and a panel,
   the bottom housing comprising an accommodating trough; and
   the panel sealing an opening of the accommodating trough, and the panel having the image capturing window.

7. The palm recognition device according to claim 6, wherein the panel is arranged inclined relative to a horizontal plane.

8. The palm recognition device according to claim 1, wherein the light component comprises a light-emitting member and a light guide ring,
   the light-emitting member being fixed on the PCB, and being electrically connected to the PCB; and
   the light guide ring surrounding the camera, and being located between the image capturing window and the light-emitting member.

9. The palm recognition device according to claim 1, further comprising a speaker,
   the speaker being located inside the housing, and being electrically connected to the PCB.

* * * * *